April 12, 1949.　　　R. C. WALLACE　　　2,466,832
WHEEL SUSPENSION

Filed April 20, 1946　　　　　　　3 Sheets-Sheet 1

INVENTOR
ROBERT C. WALLACE
BY
Toulmin & Toulmin
ATTORNEYS

April 12, 1949.  R. C. WALLACE  2,466,832
WHEEL SUSPENSION

Filed April 20, 1946  3 Sheets-Sheet 3

INVENTOR
ROBERT C. WALLACE
BY
Toulmin & Toulmin
ATTORNEYS

Patented Apr. 12, 1949

2,466,832

UNITED STATES PATENT OFFICE 2,466,832

WHEEL SUSPENSION

Robert C. Wallace, Indianapolis, Ind., assignor to Marmon-Herrington Company, Inc., Indianapolis, Ind., a corporation of Indiana Application April 20, 1946, Serial No. 663,730

5 Claims. (Cl. 280—124)

1

This invention relates to wheel suspensions and, particularly, to individual wheel suspensions for vehicles, such as trucks and the like.

The principal object of this invention is to provide an improved wheel mounting for vehicles in which a connecting axle between the suspended wheels is eliminated.

It is another object to provide a wheel suspension for the wheels of vehicles, such as trucks, such that the axle between the wheel is eliminated and the truck body may be substantially lowered.

Still another object is to provide an independent wheel suspension for the rear wheels of trucks wherein the said wheels are yieldably supported on each side of a truck bed which has a substantially flat bottom extending between the said wheels.

A still further object is to provide an independent wheel suspension for the rear wheels of trucks which provides for a rigid alignment of the wheels fully equivalent of that resulting from a rigid axle means extending between the wheels.

These and other objects and advantages will become more apparent upon reference to the following description and the accompanying drawings in which.

General arrangement

Figure 1:
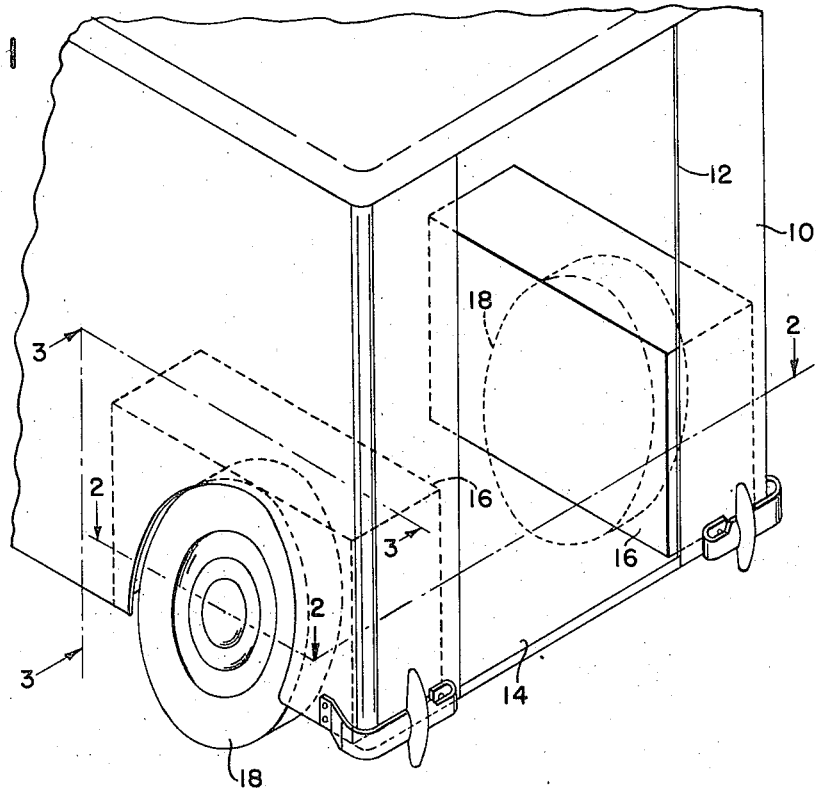
Figure 1 is a perspective view of a truck body from which the rear wheels are individually suspended according to my invention.

According to this invention, individual wheel suspensions are provided for the rear wheels of the truck body so that the floor of the truck body can be substantially lowered and extended between the wheels at a level which would be impossible if a solid axle connected the wheels. In this manner more cargo carrying capacity is provided within the truck body and the floor of the body is substantially lower to the ground so that it can be loaded and unloaded more easily.

In carrying out this invention, there is preferably provided a well or recess at either side of the truck body within which the rear wheels are placed. Within the said wells there are provided anchor means between which there are connected spaced spring members, preferably of the leaf spring type. Rigidly connected between the springs at approximately their mid points is a rigid frame or bracket which provides a mounting means to receive a spindle upon which the vehicle wheel is rotatably supported. The bracket or the spindle may also carry the stationary portion of the vehicle brake mechanism. The bracket is provided with a suitable anchoring means for receiving one end of a shock absorber, the other end of which is suitably stationarily secured to the vehicle body within the wheel well.

While the present invention has particular merit, and has been shown in connection with the rear wheel of a truck, it will become apparent that this type of wheel suspension is also adapted for supporting front or driven vehicle wheels by making slight modifications in the manner of supporting the wheel spindle.

Structural arrangement

Referring to the drawings, 10 indicates a truck body which may be open at the rear as indicated by the aperture 12, and which has a floor 14. The aperture 12 may, if desired, be adapted for being closed by a door. At either side of the said body and toward the rear thereof there are the wheel receiving recesses or wells 16.

Figure 2:
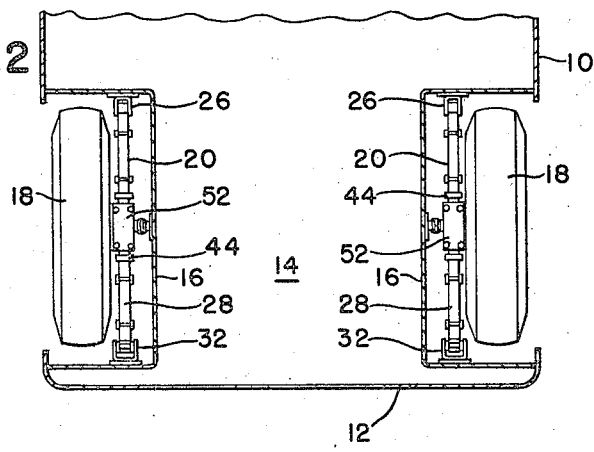
Figure 2 is a plan section taken substantially on the plane 2—2—2 in Figure 1 and showing the position of the wheels and the mountings therefor relative to the truck body.

Within the wells 16 are the wheels 18 which support the rear end of the truck and which are connected with the said truck by means of the wheel suspension of this invention generally indicated at 20 in Figure 2.

Figure 3:
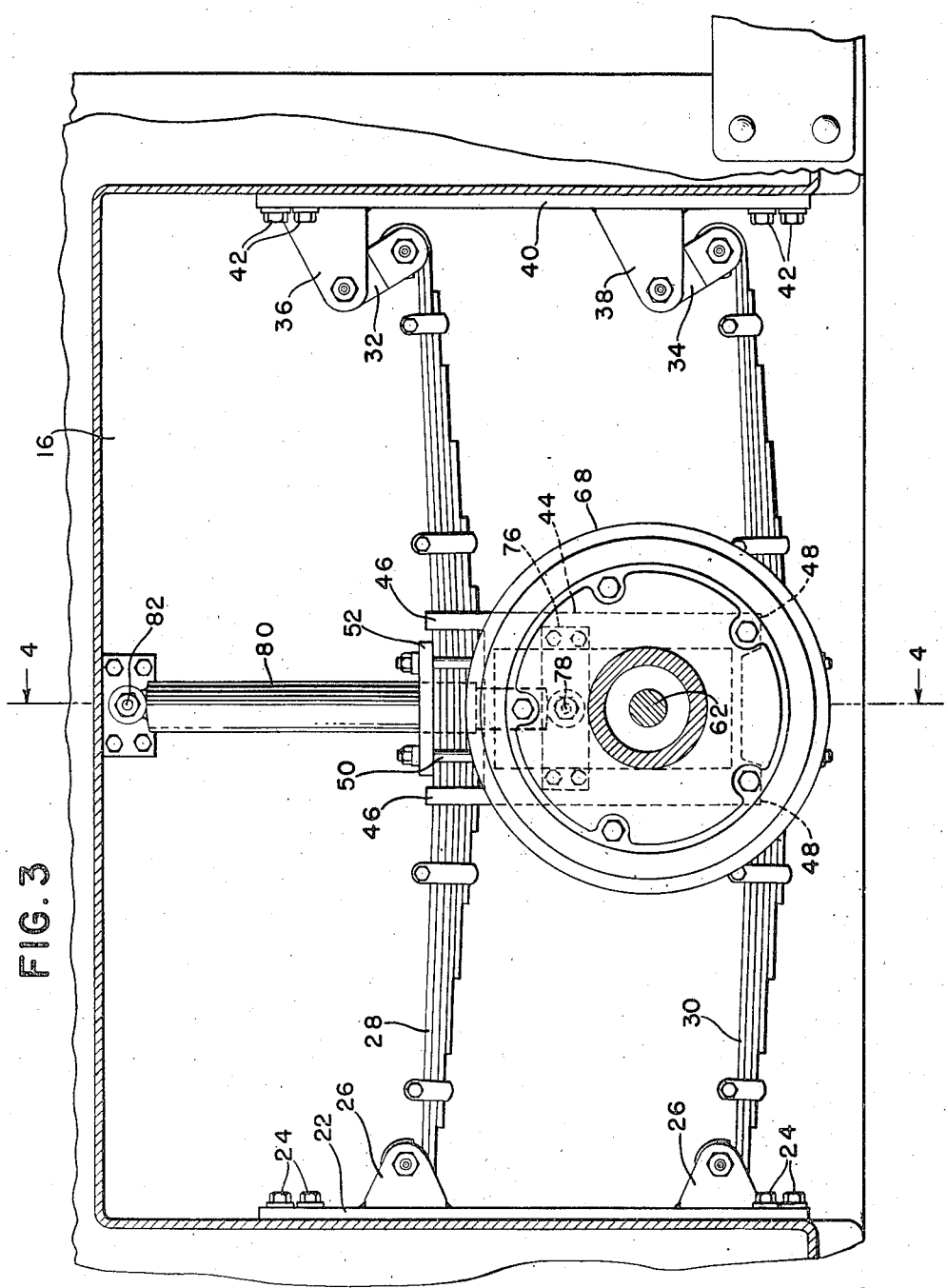
Figure 3 is a vertical section taken inside one of the wheels and indicated on Figure 1 by the plane 3—3—3.
Figure 4:
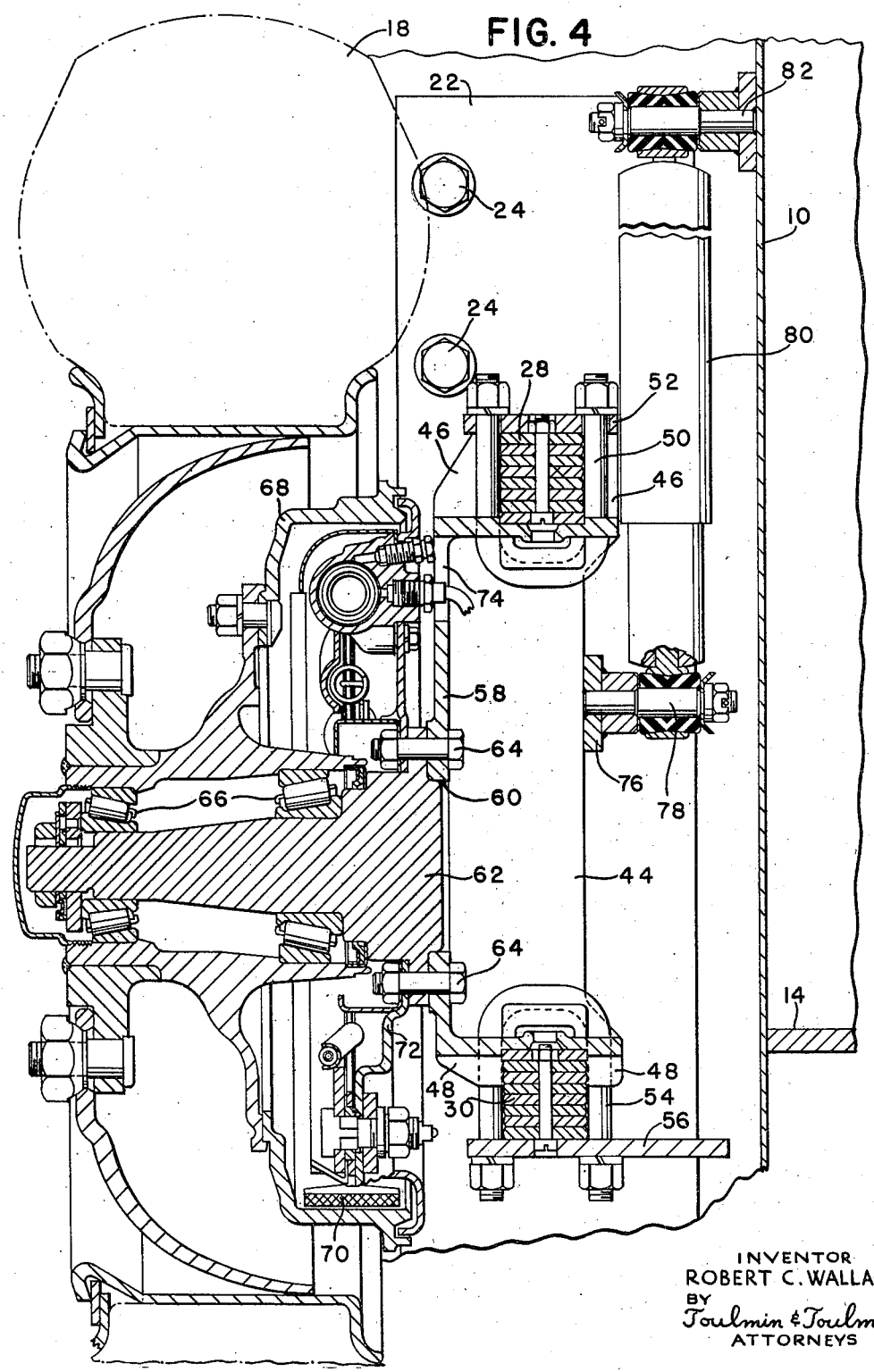
Figure 4 is a vertical section indicated by the line 4—4 on Figure 3.

In Figures 2, 3 and 4 it will be seen that within the wheel recess and at the forward end thereof there is a plate 22 rigidly secured to the wall of the recess as by the bolts 24. The plate 22 has connected therewith by any suitable means, such as by welding, a pair of shackle brackets 26 which are spaced apart and which receive the forward ends of the springs 28 and 30, respectively.

The said springs are preferably of the multiple leaf type commonly employed in automotive vehicles and extend substantially horizontally toward the rear of the recess to have their rear ends engaged by the clevises 32 and 34, respectively. The clevises are pivoted to the ends of the springs and are also pivoted in the brackets 36 and 38 which are rigidly supported on the plate 40. The plate 40, similarly to the plate 22, has means by which it is rigidly secured to the adjacent wall of the recess or wheel well as, for example, by the bolts at 42.

Intermediate the ends of the springs 28 and 30 there is a frame, box or bracket means indicated generally by the numeral 44 which comprises the upwardly extending ears 46 which span the spring 28 and the downwardly extendings ears 48 which span the spring 30. The bracket 44 is rigidly clamped to the said springs by means of the U-bolt 50 and plate 52 which enclose the spring 28 and the U-bolt 54 and the plate 56 which enclose the spring 30. Preferably, the bolts which retain the springs together have their head or nut ends extending into apertures in the clamping plates so that longitudinal shifting of the bracket along the springs is positively prevented.

The bracket 44 has an outer wall 58 which is apertured as at 60 to receive the wheel supporting spindle 62. The spindle preferably has a cylindrical extension thereon which closely fits within the aperture 60 and a peripheral flange by means of which, and the bolts 64, it may be rigidly secured to the bracket 44.

The wheel 18 includes a hub which is freely journaled on the spindle 62 as by the tapered anti-friction bearings 66 and has also a brake drum 68 which is rotatable with the wheel and relative to stationary bands as at 70 which are suitably supported within the said drum.

The aforementioned mechanism for supporting the brake bands 70 may be mounted on a plate 72 which is secured to the peripheral flange on the spindle by the spindle mounting bolts 64. The brake mechanism may include hydraulic auxiliaries to which access may be had through an aperture 74 suitably located in the wall 58 of the bracket 44.

Secured between the edges of the bracket 44 is a plate 76 which rigidly mounts a stud 78 for receiving one end of a shock absorber generally indicated at 80. The other end of the shock absorber 80 may be secured in any suitable manner to the body 10 as by means of the stud 82. Preferably, the shock absorber 80 is connected with the studs 78 and 82 by a resilient mounting such as the rubber-like bushings shown in the drawings.

It will be observed that the springs 28 and 30 are supported so as to be movable in a vertical plane only. Then, with the bracket 44 rigidly secured to the said springs there is formed a support for the wheel spindle such that the wheel also is movable in a vertical plane only. This maintains the wheels in alignment under all conditions of operation of the vehicle thereby providing for efficient operation and maximum load carrying capacity.

By spacing the springs 28 and 30 a substantial distance apart, the thrust on the truck body, due to the turning moment on the wheel suspensions when the truck is loaded, is reduced to a minimum and a wheel support that is exceedingly rigid against lateral deflection results.

It will be understood that this invention is susceptible to modification in order to adapt it to different usages and conditions and, accordingly, it is desired to comprehend such modifications within this invention as may fall within the scope of the appended claims.

I claim:

1. In a vehicle, means for supporting the floor of said vehicle in a lowered position comprising a pair of wells forming part of said body and located on opposite sides of said floor, each of said wells including a forward and a rearward substantially vertical wall and an inner side wall connecting said forward and rearward walls, a pair of leaf springs in each well, means for mounting the forward ends of said springs in said forward well wall and for mounting the rearward ends of said springs in said rearward wall of each well, a bracket extending between and connecting the center portions of each of said pairs of springs, a wheel spindle supported by said bracket between said pair of springs terminating short of said side wall, and a shock absorber having one of its ends connected to said bracket and its other end secured to said vehicle body within the said well.

2. In a vehicle, means for supporting the floor of said vehicle in a lowered position comprising a pair of wells forming part of said body and located on opposite sides of said floor, each of said wells including a forward and a rearward substantially vertical wall and an inner side wall connecting said forward and rearward walls, a pair of leaf springs in each well, means for mounting the forward ends of said springs in said forward well wall and for mounting the rearward ends of said springs in said rearward wall of each well, a bracket extending between and connecting the center portions of each of said pairs of springs, a wheel spindle supported by said bracket between said pair of springs terminating short of said side wall, and a shock absorber having one of its ends connected to said bracket between said springs and its other end secured to said vehicle body within the said well.

3. In a vehicle, means for supporting the floor of said vehicle in a lowered position comprising a pair of wells forming part of said body and located on opposite sides of said floor, each of said wells including a forward and a rearward substantially vertical wall and an inner side wall connecting said forward and rearward walls, a pair of leaf springs in each well, means for mounting the forward ends of said springs in said forward well wall and for mounting the rearward ends of said springs in said rearward wall of each well, a bracket extending between and connecting the center portions of each of said pairs of springs, a wheel spindle supported by said bracket between said pair of springs terminating short of said side wall, and a shock absorber having one of its ends connected to said bracket and its other end secured to said vehicle body within the said well, said means for mounting said leaf springs including plates mounted on said forward and rearward walls.

4. In a vehicle, means for supporting the floor of said vehicle in a lowered position comprising a pair of wells forming part of said body and located on opposite sides of said floor, each of said wells including a forward and a rearward substantially vertical wall and an inner side wall connecting said forward and rearward walls, a pair of leaf springs in each well, means for mounting the forward ends of said springs in said forward well wall and for mounting the rearward ends of said springs in said rearward wall of each well, a bracket extending between and connecting the center portions of each of said pairs of springs, a wheel spindle supported by said bracket between said pair of springs terminating short of said side wall, and a shock absorber having one of its ends connected to said bracket and its other end secured to said vehicle body within the said well, said means for mounting said leaf springs including plates mounted on said forward and rearward walls, and brackets connecting the ends of the springs to said plates.

5. In a vehicle, means for supporting the floor of said vehicle in a lowered position comprising a pair of wells forming part of said body and located on opposite sides of said floor, each of said wells including a forward and a rearward substantially vertical wall and an inner side wall connecting said forward and rearward walls, a pair of leaf springs in each well, means for mounting the forward ends of said springs in said forward well wall and for mounting the rearward ends of said springs in said rearward wall of each well, a bracket extending between and connecting the center portions of each of said pairs of springs, a wheel spindle supported by said bracket between said pair of springs terminating short of said side wall, and a shock absorber having one of its ends connected to said bracket and its other end secured to said side wall of said well.

ROBERT C. WALLACE.

REFERENCES CITED

The following references are of record in the file of this patent:

UNITED STATES PATENTS

| Number | Name | Date |
|---|---|---|
| 144,473 | Nichols | Nov. 11, 1873 |
| 1,621,677 | Masury | Mar. 22, 1927 |
| 1,867,647 | Brock | July 19, 1932 |
| 2,044,196 | Alden et al. | June 16, 1936 |
| 2,077,710 | Pribil | Apr. 20, 1937 |
| 2,330,182 | Theriault | Sept. 21, 1943 |

FOREIGN PATENTS

| Number | Country | Date |
|---|---|---|
| 24,278 | Australia | Dec. 16, 1930 |
| 463,838 | France | Dec. 27, 1913 |